Feb. 11, 1941. W. A. DOUGLASS ET AL 2,231,059
FLUID PRESSURE VALVE
Filed April 24, 1939  2 Sheets-Sheet 1

INVENTORS:
WILLIAM A. DOUGLASS AND
GEORGE B. SMITH
BY Harry A. Bimmer
ATTORNEY

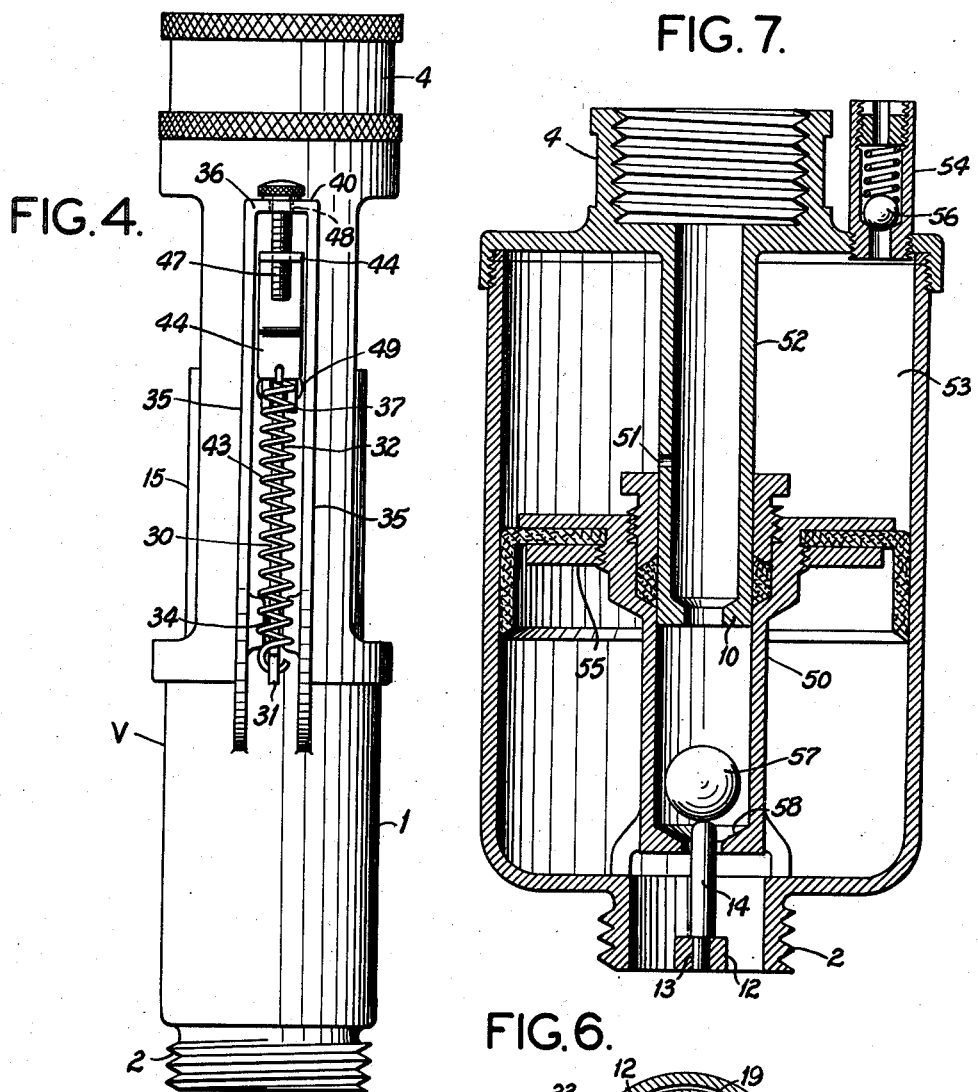
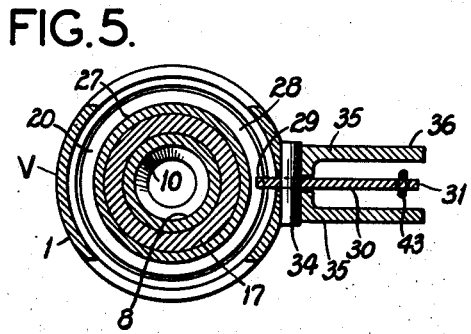
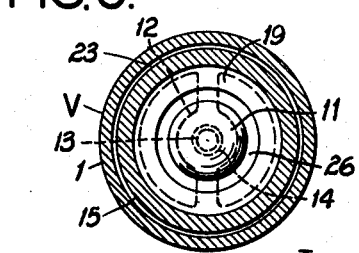

Patented Feb. 11, 1941

2,231,059

UNITED STATES PATENT OFFICE 2,231,059

FLUID PRESSURE VALVE

William A. Douglass, Kirkwood, and George B. Smith, Richmond Heights, Mo.

Application April 24, 1939, Serial No. 269,592

5 Claims. (Cl. 137—139)

Our invention has relation to improvements in fluid pressure valves and consists of the novel features of construction more fully set forth in the specification and pointed out in the claims.

The invention is directed primarily to a valve for insertion between a water faucet and a sprinkling hose that will operate automatically in response to the back pressure within the hose when the hose nozzle is closed in order to effect a reduction in said pressure and relieve the hose and fittings of the strain resulting therefrom.

Figure 1:
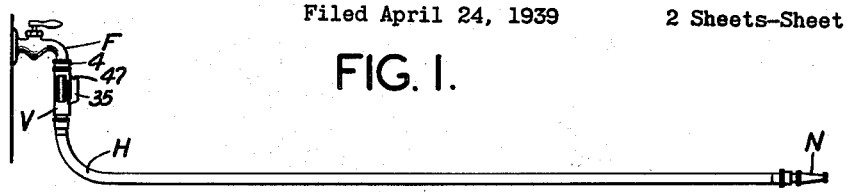
Figure 2:
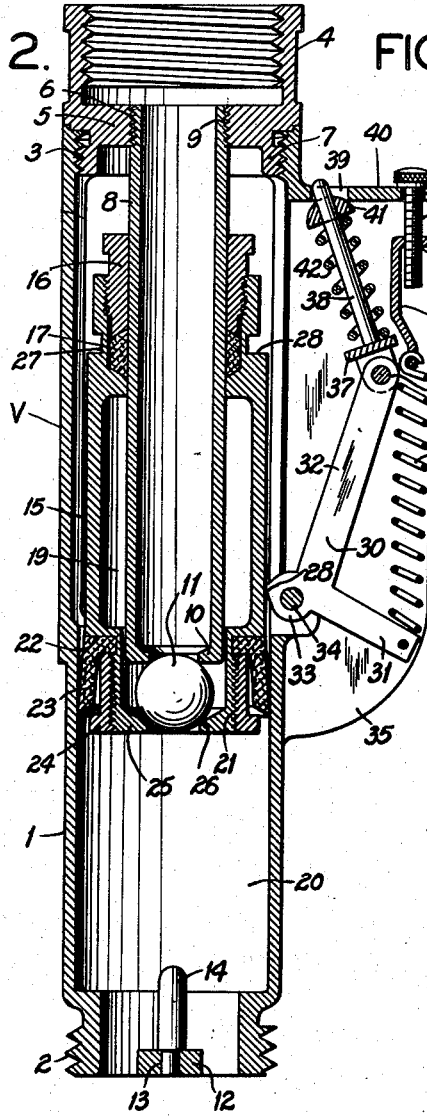
Figure 3:
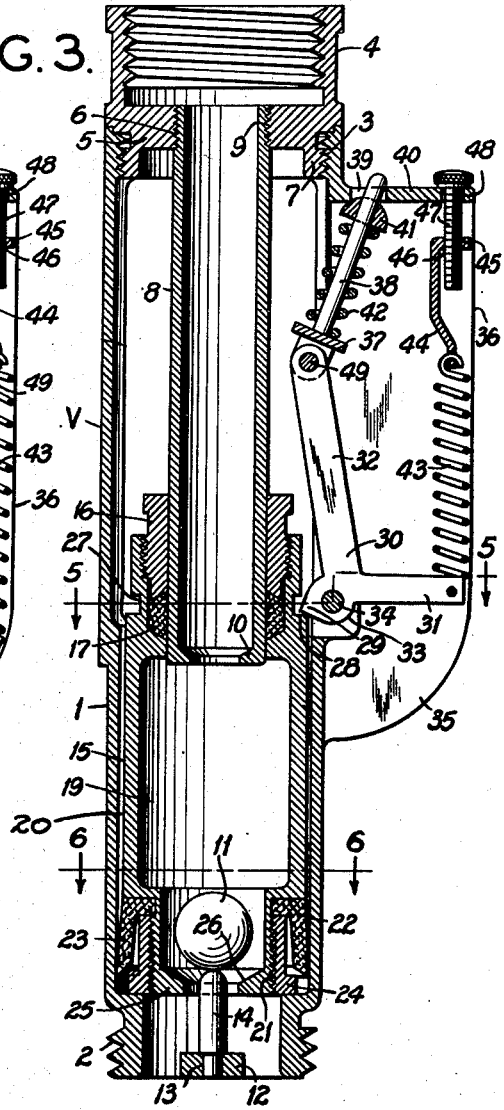

The principal object of the present invention is to provide a valve of the character referred to that is not cumbersome and that may be manufactured at a reasonably low cost, but at the same time will function automatically and with certainty in response to the pressures created therein an opening and closing the sprinkler nozzle attached to the end of the hose. This object, together with such advantages as are inherent in the invention, will be better apparent from a detailed description thereof in connection with the accompanying drawings, in which:

Figure 1 is a side elevation of a faucet and a sprinkler hose, between which is inserted our improved fluid pressure valve; Fig. 2 is a vertical middle longitudinal section through our improved valve with parts remaining in elevation, with the valve plunger shown at the end of its upstroke, in which position the valve is closed to shut off the line pressure from the hose; Fig. 3 is a similar section with the valve plunger at the end of its downstroke, in which position the valve is open so that the fluid will flow through the hose freely when the hose nozzle is also open; Fig. 4 is a side elevation of our improved valve looking toward the side on which the valve trigger is mounted: Fig. 5 is a cross-sectional detail taken on a plane indicated by the line 5—5 of Fig. 3; Fig. 6 is a cross-sectional detail taken on a plane indicated by the line 6—6 of Fig. 3; and Fig. 7 is a middle longitudinal section taken through a modified form of valve.

Referring to the drawings, F represents a water faucet to which is attached our improved valve V, which in turn has the garden hose H attached to it, at the outer end of which is the usual sprinkling nozzle N. As well understood in the art, sprinkling nozzle N is designed to control the shape of stream issuing from the hose H, and may be adjusted so as to entirely cut off the flow from the hose H. It is the purpose of our improved valve V to operate in a manner so that the pressure in the hose H will be reduced at such time as the nozzle N is closed and the faucet F allowed to remain open.

Our improved valve V embodies a tubular casing 1, having a threaded extension 2 at its lower end, and being internally threaded at 3 at its upper end to receive a coupling member 4 whereby the valve is attached to the faucet F. Within the coupling member 4 is an annular flange 5 provided with threads 6, and from the periphery of the flange 5 a threaded extension 7 projects whereby the coupling is secured within the threaded extremity 3 of the casing 1. A tube 8 is provided with threads 9 on one end whereby it is secured into the annular flange 5 of coupling 4, said tube extending into the casing 1 a considerable distance, and terminating in an inwardly projecting flange 10 which provides a seat for a ball valve 11. Within the threaded extension 2 contiguous to the outer end thereof is a cross member 12 provided with an opening 13 into which is fixed the reduced extremity of an inwardly projecting pin 14.

The parts thus far described are immovable but cooperate with the movable member 15, which is in effect a plunger or piston slidably mounted on the tube 8. The upper end of the piston 15 is provided with the usual gland 16 and packing 17 to prevent the leakage of fluid from chamber 19 within the piston 15 upwardly into the chamber 20 within casing 1. The lower end of the piston 15 is provided with a threaded extension 21 of a reduced diameter so as to provide an annular shoulder 22 against which is seated a cup-washer 23 and held securely in place by a threaded nut 24 passed over the threaded extension 21. Within the lower end of the threaded extension 21 is an inwardly projecting flange 25 which provides a valve seat 26 for the ball valve 11 hereinabove referred to. The cup-washer 23 of course prevents the passage of fluid from the bottom of the chamber 20 upwardly past the piston 15 into the upper part of said chamber.

Near the upper end of the piston 15, approximately opposite the packing 17, an annular recess 27 is formed which provides a shoulder 28 against which the toe 29 of a trigger 30 may impinge when the piston is forced into position to open the valve, as will be more fully hereinafter explained.

The trigger 30 comprises a short lever arm 31 and a long lever arm 32, at the convergence of which is the perforated hub 33 of the lever which is mounted on a pin 34 fixed between side walls

35, 35 of a housing 36 projecting laterally from the casing 1. The upper end of lever 32 is connected to the flanged head 37 of a stem 38, the outer end of which is disposed in a slot 39 in top wall 40 of housing 36, and a semi-spherical abutment member 41, perforated to receive the stem 38, bears against the under surface of the wall 40 under the pressure of a coiled spring 42 disposed on said stem between the member 41 and the flanged head 37 of the stem. The outer end of lever 31 has a coiled spring 43 attached to it and the opposite end of said spring is connected to a link 44 having a laterally extending finger 45 provided with a tapped opening 46 for receiving a stud 47 mounted in an opening 48 in the top wall 40 of the housing 36. By virtue of the stud 47 the tension of the spring 43 may be adjusted so that when the lever 32 and stem 38 are in the position shown in Fig. 2 their pressures will be balanced so that there will be little or no pressure of the toe 29 against the side of piston 15. However, when the pivotal connection 49 between the lever 32 and stem 38 (which members form in effect a toggle) passes dead center in moving from the position shown in Fig. 2 to that shown in Fig. 3, the pressure of the springs 42 and 43 becomes cumulative so as to force the the toe 29 of the trigger downwardly with considerable pressure, at which time the toe 29 of the trigger will be in engagement with the shoulder 28 as shown in Fig. 3.

The foregoing comprises the description of the parts involved in our improved valve construction. The operation of the valve may be described as follows:

Referring to Fig. 2 it will be observed that the valve is closed with the ball 11 confined between the flange 10 and valve seat 26. The valve occupies this position when the faucet F is open and the nozzle N is closed. The pressure within the hose and of course within the chamber 20 is effective against the outer surface of extension 21, nut 24, and the lower edge of the cup washer 23, and owing to the larger area of this surface this pressure overcomes the pressure from the faucet and effective on the ball 11. Thus the valve will be held closed by the back pressure within the hose H.

If the operator now opens the nozzle end to release the pressure within the hose the pressure within the lower part of chamber 20 will of course drop, allowing the line pressure from the faucet F to force the piston 15 downwardly until the annular recess 27 comes opposite the toe 29 of the trigger 30, whereupon the force of spring 43 will tend to straighten out the toggle formed by the stem 38 and the lever 32 until it passes dead center, after which the combined forces of the springs 42 and 43 will cause the toe 29 to bear down forcibly on the shoulder 28 forcing the piston to its ultimate open position, at which time the ball 11 will be unseated by impingement on the pin 14. At this time the fluid from the faucet F is free to flow through the tube 8, chamber 19 within piston 15, and through the projecting flange 25 to the hose H.

If the operator now chooses to close the nozzle end (the valve of course being in the position shown in Fig. 3) the increased back pressure created within the hose H will force the piston 15 upwardly, unseating the trigger 30 from the shoulder 28, whereupon the toggle will be thrown to the position shown in Fig. 2 and the piston 15 continue to rise until it comes to its closed position as shown in Fig. 2. Obviously as the piston rises the lower part of chamber 20 is brought into direct communication with the hose H, thereby increasing the space for the entrapped fluid within the hose H and reducing the pressure therein so as to take the strain off the hose and off the fittings. As soon as the piston rises sufficiently to allow the ball valve 11 to settle on its seat 26 there will be no further flow of fluid into the hose H, and the back pressure within the hose will cause the piston to continue to travel upwardly until the total back presure against the piston balances with the pressure of the incoming fluid. Thus the piston need not necessarily travel its maximum distance upwardly but may come to rest somewhere in between its lowermost and uppermost positions.

In Fig. 7 we show a modified form of the invention which dispenses with the toggle and trigger arrangement, utilizing instead the pressure of the fluid to hold the piston 50 downwardly. This is accomplished by a port 51 in the wall of tube 52 on which the piston 50 slides. The pressure within the upper part of chamber 53 is relieved by ball check valve 54 of usual construction.

In the operation of the modified form of valve the piston is in the position shown in Fig. 7 when the water is flowing freely for sprinkling operations. However as the operator closes the nozzle N the back pressure against the piston head 55 forces the piston upwardly, closing the port 51. When the pressure within the chamber 53 is sufficient to unseat the ball 56 the fluid escapes from valve 54 and the piston 50 continues to rise until ball 57 is confined between valve seat 58 and the perforated end of tube 52, similar to the action in the main form. The primary purpose of the port 51 is to permit fluid to accumulate in the upper part of chamber 53 when the valve is open so as to hold the piston 50 in operative position by the pressure of the fluid thereon.

While we have described a pressure valve for use primarily with fluids, we wish it to be understood that the valve may be operated with equal advantage in connection with the distribution of air or other gases. When used with gases it may be necessary to effect some changes in specific details but the general principles embodied in the valve will remain the same.

Having described our invention, we claim:

1. A fluid pressure valve embodying a casing having a chamber with a fluid intake at one end thereof and fluid outlet at the opposite end, a piston movable in said chamber, a valve associated with said piston, said piston having an abutment surface exposed to the intake side of said chamber and an opposing abutment surface of greater area exposed to the outlet side of the chamber, and means near the outlet from the chamber effective to open said valve when the piston has moved to the outlet side of the chamber.

2. A fluid pressure valve embodying a casing having a chamber with a fluid intake at one end thereof and fluid outlet at the opposite end, a piston movable in said chamber, a valve associated with said piston, said piston having an abutment surface exposed to the intake side of said chamber and an opposing abutment surface of greater area exposed to the outlet side of the chamber, means near the outlet from the chamber effective to open said valve when the piston has moved to the outlet side of the chamber, and a retaining device for holding the piston adjacent to the outlet side of the chamber.

3. A device of the class described embodying a casing having a pressure chamber with an inlet and an outlet, a hollow piston adapted for reciprocation in said chamber, said piston having a valve seat and a valve associated therewith, said valve and valve seat together forming a closure for the piston with opposite abutment surfaces of unequal area, the surface facing the chamber outlet having the greater area, valve-unseating means near the chamber outlet effective on the valve when the piston has reached the end of one reciprocation, and spring actuated means for holding said piston in such position.

4. A device of the class described embodying a casing having a pressure chamber with an outlet at one end, a tube within said chamber and serving as an inlet therefor, a hollow piston mounted on said tube for reciprocation within the chamber, a valve within the piston and cooperating therewith to close the tube for one position of the piston, means for impingement on the valve to open the same for another position of the piston, and means for holding the piston in position to keep said valve open.

5. A pressure valve for fluent mediums embodying a casing having a chamber with an intake at one end thereof and an outlet at the opposite end, a piston movable in said chamber, a valve associated with said piston, said piston having an abutment surface exposed to the intake side of said chamber and an opposing abutment surface of greater area exposed to the outlet side of the chamber, and means near the outlet from the chamber effective to open said valve when the piston has moved to the outlet side of the chamber.

WILLIAM A. DOUGLASS.
GEORGE B. SMITH.